United States Patent [19]
Rzeszewski

[11] 4,048,652
[45] Sept. 13, 1977

[54] AUTOMATIC HUE CONTROL SYSTEM
[75] Inventor: Theodore S. Rzeszewski, Lombard, Ill.
[73] Assignee: Motorola, Inc., Chicago, Ill.
[21] Appl. No.: 629,427
[22] Filed: Nov. 6, 1975

Related U.S. Application Data

[63] Continuation of Ser. No. 464,225, April 25, 1974, abandoned.

[51] Int. Cl.² .............................................. H04N 9/535
[52] U.S. Cl. ...................................................... 358/28
[58] Field of Search ........................................... 358/28

[56] References Cited
U.S. PATENT DOCUMENTS

| | | | |
|---|---|---|---|
| 3,647,941 | 3/1972 | Anorade | 358/28 |
| 3,688,021 | 8/1972 | Ekstrand | 358/28 |
| 3,715,471 | 2/1973 | Nakabe et al. | 358/28 |
| 3,740,459 | 6/1973 | Okada | 358/28 |
| 3,743,764 | 7/1973 | Wittmann | 358/28 |

Primary Examiner—Richard Murray
Assistant Examiner—Mitchell Saffian
Attorney, Agent, or Firm—Maurice J. Jones, Jr.

[57] ABSTRACT

An automatic hue control system operates to correct the phase of the color subcarrier reference signal used to operate the demodulators of a color television receiver. A regenerated color subcarrier signal at the phase of the I axis or the axis of flesh color is fed to one input of a phase comparator. The amplitude limited chrominance signal is fed to another input of the phase comparator, the output of which is used to operate a single pole double throw switch circuit. The switch passes the regenerated subcarrier signal to the demodulators when the phase difference between the limited chrominance and the regenerated subcarrier signals is outside a predetermined angle on each side of the I or flesh axis. Whenever the phase relationship between the limited chrominance signal and the subcarrier reference signal places the two signals within the predetermined angle on each side of the I or flesh axis, the switch circuit passes the limited chrominance signal to the demodulators as the color subcarrier reference signal.

26 Claims, 4 Drawing Figures

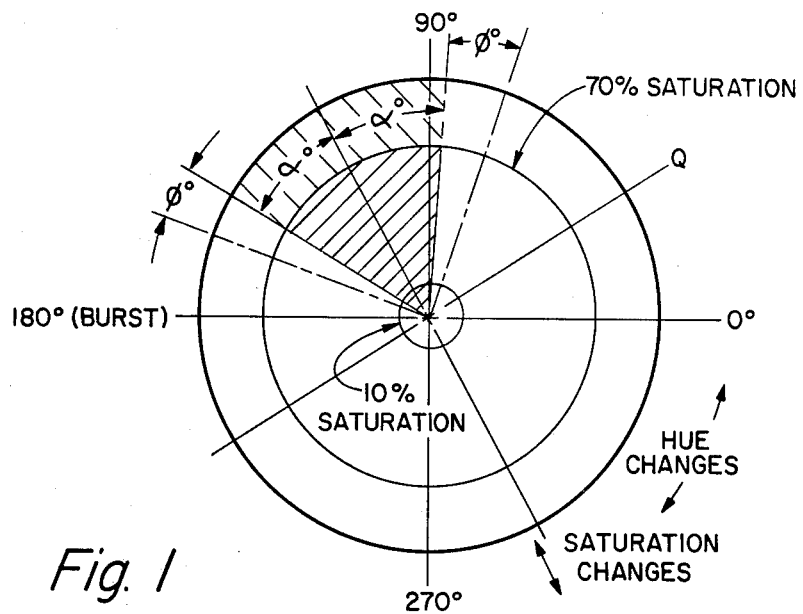
Fig. 1
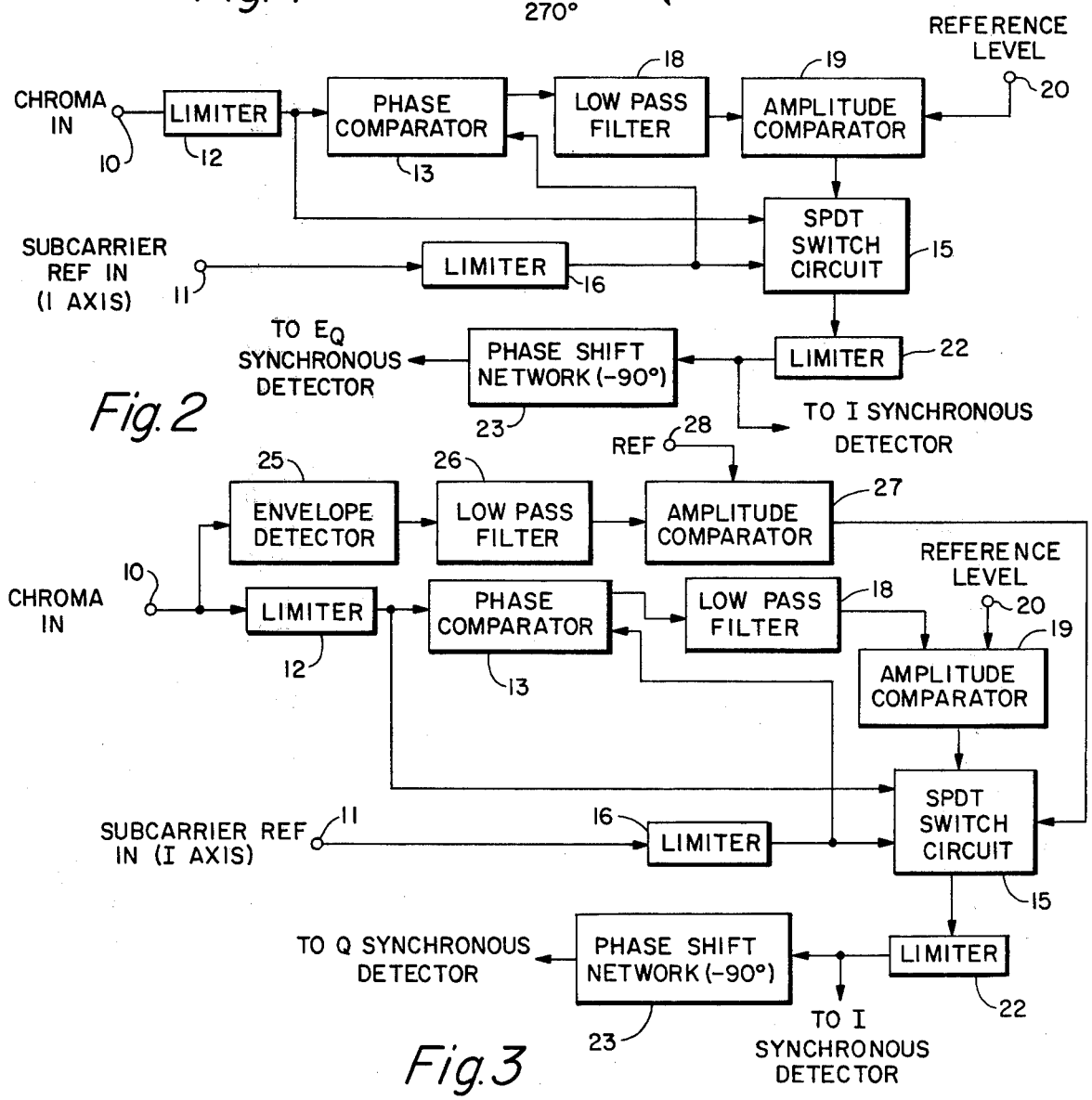
Fig. 2
Fig. 3

AUTOMATIC HUE CONTROL SYSTEM

This is a continuation, of application Ser. No. 464,225, filed Apr. 25, 1974, now abandoned.

BACKGROUND OF THE INVENTION

The NTSC color television signal presently in use includes a wideband brightness or luminance (Y) signal and a modulated subcarrier signal of approximately 3.58 megahertz. The subcarrier signal is phase and amplitude modulated by 1 and Q chrominance signals which are modulated in quadrature so that the phases of the subcarrier represent the hue of an image portion and the ratio of the subcarrier amplitude to Y at that particular phase represents the saturation of that hue. A monochrome receiver yisibly reproduces only the Y component.

The usual color television receivers include two or three color demodulators for synchronously recovering the color difference signals which then can be added to the Y signal in a matrix circuit for developing the red, blue and green representative signals to be reproduced by the cathode ray tube. Other receivers include direct demodulators for directly developing the red, blue and green color representative signals, thereby avoiding the separate recovery and combination of the brightness signal with the demodulated color difference signals.

In either of these types of receivers, however, it is necessary to provide a properly phased reference signal at the subcarrier frequency in order to produce color representative output signals at the proper hues. In the NTSC system, this is accomplished by including in the television signal bursts of a reference signal of the same frequency as the color subcarrier and having a particular phase relationship with the different phases of the subcarrier representing the different hues. These reference signal bursts are recovered at the receiver by a gating action and are applied to an automatic frequency control circuit associated with the local oscillator at the receiver. The recovered burst signal and the output signal from the oscillator are compared to develop a control signal which is utilized to control the oscillator so that its output signal is a continuous wave of the proper frequency and phased to be used as a demodulating reference signal for the color subcarrier.

Since the burst signal theoretically occupies a position having a precise phase relationship with the modulated subcarrier signals, a local oscillator which is phased-locked to the burst signal, should provide an accurate reference signal for demodulating the correct hues of the transmitted signal. Thus, once a hue setting is made by the operator of the television receiver to suit his particular taste, theoretically it is not necessary to change that hue setting thereafter.

In actual practice, however, incorrect hue in the reproduced color picture has been a problem from the beginning of color broadcasting. The user can adjust the hue control at the reaceiver for optimum color reproduction, but this adjustment is only temporary. It has been found that the transmitted burst does not always occupy the same phase relationship with the modulated color difference signals from station to station, from program to program on a given station, or even from camera to camera on a given program. Each of these variations requires a readjustment of the hue control. For most objects, these shifts in hue or color are not detectable by the viewer since he has no reference based on previous information to make an exact comparison. Certain objects, however, such as green trees or blue sky provide a convenient reference. However, the most critical and common color reference in the reproduced picture that the viewer can rely upon is the color of flesh tones. The viewer detects errors in the color reproduction of flesh tones since he has a pre-established reference for flesh tones in his own mind. There is some flesh color in the vast majority of scenes, so that hue errors in flesh colors are particularly annoying. Therefore, an automatic hue control should provide an automatic flesh color control and, if possible, provide a minimum amount of distortion for other colors, particularly for green and blue (since these colors also have preestablished references in the minds of the viewers).

Since the hue of flesh colors lies very near the positive 1 axis (+1), it is desirable to dynamically adjust the hue of all colors that are near the phase of the positive 1 axis to the phase of that axis or the axis of flesh; so that flesh color will always appear correct, even if there is a phase shift of the chrominance signal relative to the regenerated reference subcarrier. If in the process of doing this, the hue (phase) of other colors that are near the positive 1 axis is changed slightly, it is unlikely that the viewer will notice this; because there is no common video content reference for the viewer to remember and these colors are not such as have a predetermined memory relationship for a viewer. The exact angle of flesh tones is just slightly off the positive 1 axis, five to ten degrees toward the red axis of a standard color phase diagram, regardless of the race of the person viewed. Therefore, saturation not hue is the main variable in flesh color. The range of flesh saturation is from ten to seventy percent as determined by extensive observation of color television programming.

The two most common approaches to automatic hue control are (1) changing the decoding angles to emphasize the 1 axis colors, and (2) reducing the Q component of the chrominance signal when the chrominance signal is near the positive 1 axis.

The advantage of a method which changes the decoding angles is economy, and this approach also can be implemented by static adjustments. However, changing the phase angles to emphasize 1 axis colors tends to make the color reproduction more like a two-color system and produces relatively large color distortions in both hue and saturation. The most noticeable distortions are usually in green, which normally is very near the angle of the negative Q axis. In this type of system, the reproduced green color gets a strong blue content or becomes de-saturated or both. Since the viewer remembers the true color of vegetation, the bluish cast given to scenes with vegetation, such as a forest scene, a football or baseball game, is quite noticeable. A more consistent rendition of flesh color is achieved at the expense of faithful green reproduction.

The second approach which has been used is one which automatically reduces the Q component of the chrominance signal whenever the chrominance signal is within a predetermined angle about the the positive 1 axis. This approach usually results in an economic penalty, because of the need for bandpass filters centered at the color subcarrier frequency at approximately 3.58 megahertz and also usually involves relatively comples circuitry. In addition, there is a saturation error associated with such an approach resulting from the collapsing of the Q component of the signal to the 1 axis. Such saturation errors can be minimized by introducing additional circuit complexity.

It is desirable to minimize color errors in an NTSC color television receiver in a way which is not subject to the disadvantages of the systems discussed above and to do so economically.

SUMMARY OF THE INVENTION

Accordingly, it is an object of this invention to provide an improved automatic hue control system for a color television receiver.

It is an additional object of this invention to provide an automatic hue control system which provides a hue control only in a narrow wedge or angle on each side of the positive 1 axis and which leaves substantially uneffected hues lying outside of this wedge.

it is another object of this invention to operate on the subcarrier reference signal for an automatic hue control system to maintain the correct amplitude or saturation of the chrominance signal.

It is a further object of this invention to use a conventionally regenerated reference signal for signals having phases outside of a predetermined range of the axis of flesh colors and to use the chrominance subcarrier signal itself as the reference signal for chrominance signals having phases lying within a narrow wedge of angles on each side of the axis of the flesh colors.

In accordance with a preferred embodiment of this invention, the subcarrier reference signal which is supplied to the demodulator section of a television receiver (either an 1/Q receiver or an R, G, B receiver) is established under the control of a subcarrier reference signal control circuit to which a regenerated subcarrier reference signal at a phase corresponding to the 1 axis is applied, along with the chrominance signal. The chrominance signal and the 1-phase subcarrier reference are passed through limiter circuits to produce reference signals of equal amplitude.

These signals are applied to a phase comparator which produces an output voltage indicative of the phase relationship between the two signals. The output of the phase comparator is further applied to an amplitude comparator which has a reference level voltage applied to it to establish a range of control for the system.

The amplitude comparator operates a single pole double throw switching circuit to which are applied the two limited subcarrier reference signals. The switching circuit passes the regenerated subcarrier reference signal through to its output for utilization by the synchronous detectors or demodulators of a television receiver whenever the phase comparator output indicates that the chrominance signal is outside the desired range of control near the positive 1 axis. Similarly, whenever the chrominance subcarrier signal is within the range of control near the positive 1 axis, the amplitude comparator causes the switching circuit to pass the limited chrominance output signal as the reference signal to the demodulators. Since this signal is exactly in phase with the modulated chrominance signal applied to the demodulators, the result is to cause all signals which lie within the angle or wedge of the control established by the reference level voltage to be demodulated as if they were on the positive 1 axis.

BRIEF DESCRIPTION OF THE DRAWINGS

FIG. 1 is a color phase diagram which is useful in describing the operation of the system;

FIG. 2 is a block diagram of a preferred embodiment of the invention;

FIG. 3 is a block diagram of another embodiment of the invention; and

DETAILED DESCRIPTION

Figure 4:
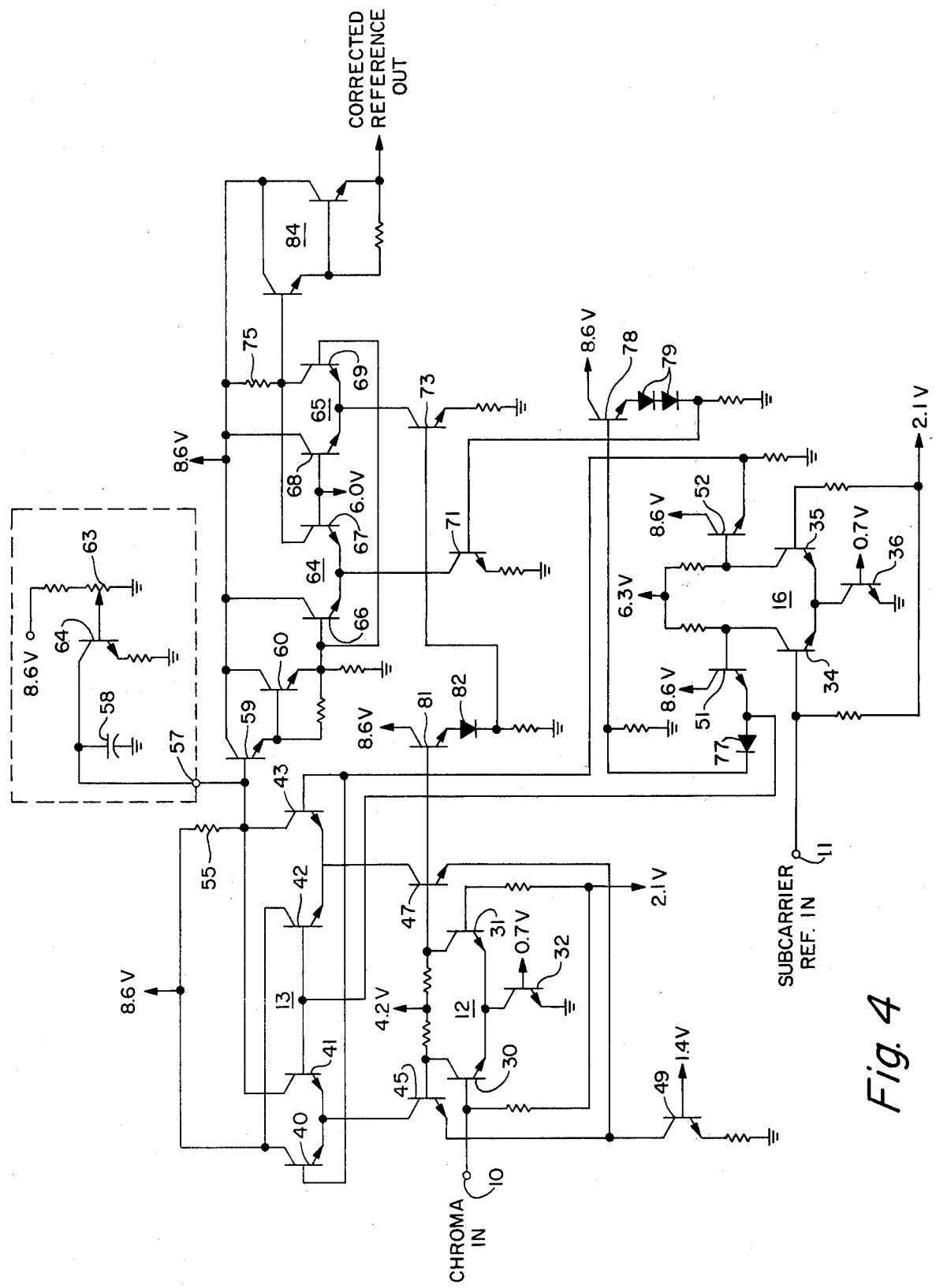
FIG. 4 is a detailed schematic diagram of the circuit shown in FIG. 2.

The automatic hue control system which is disclosed in FIGS. 2, 3 and 4 dynamically adjusts the hue of all colors that are near the positive 1 axis to the phase of the positive 1 axis, so that flesh colors appear correct in spite of possible ambiguities in the relative phase between the chrominance signal and the regenerated color subcarrier. The positive 1 axis is considered in this description for ease of illustration and understanding. The flesh color axis actually is five to ten degrees off the positive 1 axis toward R-Y (the 90° line in FIG. 1) and would be used for most accurate control. The 1 axis, however, is commonly accepted as the color axis which corresponds to flesh; and the description is directed to the system operation as if the flesh colors were directly on the positive 1 axis.

The system disclosed in FIGS. 2, 3, and 4 does not distort green, nor change the chrominance amplitude of the colors which it does correct. The control is exercised by operating on the reference signal rather than by operating on the chrominance informance information as was commonly done in past automatic hue correction circuits. Because of this, the correct amplitude of the chrominance signal is maintained.

FIG. 1 illustrates the range of the chrominance signal hue range (2 α) over which the phase of the reference signal is shifted to coincide with the phase of the information, or alternatively, where the chrominance subcarrier itself is used to detect the chrominance information. This insures that the detected hue is caused to be on the positive 1 axis when it is within an angle alpha (α) on either side of the positive 1 axis. For signals which are outside that range, the conventionally regenerated subcarrier reference signal is used for detection of the modulated chrominance information.

The optimum control range which is selected is a compromise of several factors. Ideally, this range should be a small as possible so that there is a minimum amount of distortion in hue caused in colors that are intended to be near the positive 1 axis but which are not flesh colors. On the other hand, there must be enough range to correct flesh colors for the large majority of phase mis-alignment between the chrominance subcarrier signals and the regenerated subcarrier reference in the television receiver. It has been found that a range of plus or minus 30° or 35° is an ideal wedge or angle of control for the angle α. Thus, the total range of control is between 60° and 70°.

It has been found that a phase error of ± 5° in the hue setting of flesh is a just perceptible hue shift to most observers. A control range of ± 35° will not cause control or shift on a nominal yellow or magenta color since these are more than 50° from the positive 1 axis. Since green and blue are even farther from the positive 1 axis, these colors are not altered by the system either. The net result is a minimum of color distortion which is not offensive partly because only the hue is changed and the chrominance amplitude is not, and partly because a hue change of 20° or 30° for objects other than flesh usually is not offensive. In addition, familiar objects like green grass or blue sky are not altered at all by the control system.

FIG. 2 is a block diagram of the color subcarrier correction system. As stated previously, since the hue information is a function of the relative phase between the chrominance signal subcarrier and the regenerated color subcarrier which has a fixed phase relationship to the burst component, an undesired phase shift in either of these two signals results in an incorrect hue in the reproduced color. For the purpose of the present analysis, assume that the regenerated color subcarrier is a fixed reference, and that any undesired phase shifts occur in the chrominance signal channel. This can be done without any loss of generality in the discussion of the operation of the system since the relative variations caused by changes in either of these two signals are compensated for the this system.

The system shown in FIG. 2 has two inputs. The composite chrominance signal derived from the color television signal processing circuits is applied on an input terminal 10. The regenerated color subcarrier which is produced by the reference oscillator in the color television receiver is applied to an input terminal 11.

The chrominance signal is fed through a limiter circuit 12 which produces a constant amplitude signal at the received chrominance signal frequency, the phase of which follows the phase of the incoming chrominance signal. While a limiter circuit 12 is shown in FIG. 2, a phase-locked loop having a sufficiently wide bandwidth to allow the output signal to follow the input chrominance signal phase variation also could be utilized. The signal at the output of the limiter 12 is fed to one input of a phase comparator 13 and to one input of a single-pole, double-throw switching circuit 15.

The other system input, the subcarrier reference input 11, is supplied at the phase of the positive 1 axis. This is accomplished by a conventional phase shift circuit (not shown) coupled to the output of the 3.58 Mhz oscillator which is locked in phase to the burst signal component in the television receiver. This signal also is passed through a limiter circuit 16 to produce a signal of constant amplitude which preferably is of the same amplitude as the signal produced by the limiter circuit 12. The output of the limiter circuit 16 is supplied to a second input of the single-pole, double-throw switch circuit 15 and to a second input of the phase comparator circuit 13.

Since both of the input signals applied to the phase comparator circuit 13 are of the same constant amplitude, the output of the phase comparator 13 is only dependent on the relative phase between the two input signals. As a consequence, the phase comparator 13 operates as an amplitude insensitive comparator, giving a maximum output when the two input signals are in phase with one another and producing a minimum output when the signals are 180° out of phase.

When the chrominance signal on the terminal 10 is in quadrature with the 1 axis subcarrier signal on the terminal 11, the output of the phase detector is at an intermediate level which is the normal quiescent bias level for the detector except for some high frequency feedthrough components of the two inputs and higher frequency components generated as a result of the mixing action of the phase comparator. These higher order terms are filtered out by a low pass filter 18 which has a passband wide enough to pass the desired control signal but still rejects the high frequency components. Since the wide bandwidth capabilities of the $E_1$ signal are not presently used in consumer television receivers, the low pass filter bandwidth of the filter 18 need only be slightly greater than 0.5 MHz to pass the appropriate control signal.

The filter output is a low frequency (0 to 0.5 MHz) control signal which is compared in amplitude to a direct current reference signal in an amplitude comparator 19. When the filter control signal is greater than the direct current reference signal applied to the comparator 19 on a terminal 20, the signal-pole, double-throw switch is placed in a state to pass the limited chrominance signal from the output of the limiter 12 and to block the subcarrier reference signal on the output of the limiter 16. When the control signal from the filter 18 is less than the reference level signal on the terminal 20, however, the output of the amplitude comparator 19 sets the switch circuit 15 to pass the regenerated subcarrier reference signal from the limiter 16 through to its output; and the switch blocks the output of the limiter circuit 12.

The signals appearing on the output of the switch circuit 15 are fed through another limiter circuit 22 and can be used directly in an I/Q television receiver to operate the I synchronous detector or demodulator. These signals also are passed through a 90° phase shift network 23 to produce the reference carrier used to operate the Q demodulator.

Although the system shown in FIG. 1 is illustrated as being used for I/Q detection, any decoding angles can be accommodated by appropriate phase shifting of the output signal obtained from the limiter 22. For example, in a television receiver used to directly demodulate red, green and blue (R, G, B) the output of the limiter 22 is split into three separate paths, each phase-shifted the appropriate amount for R, G and B detection, respectively. As a consequence, whenever the control is effected by operation of the switch circuit 15, the phase of the reference in all three channels is changed. The basic operation of such a system is exactly the same as for an I/Q receiver.

The angle $\alpha$ illustrated in FIG. 1 is determined by the magnitude or level of the reference voltage applied to the terminal 20 of the amplitude comparator 19. As this reference level voltage is varied up and down in magnitude, the phase angle $\alpha$ over which the control is effected is widened and lessened accordingly. For example, in the circuit of FIG. 2, as the reference voltage 20 is increased, the angle $\alpha$ is decreased.

The systen shown in FIG. 2 can be used to correct the hue of flesh tone variations for phase variations as large as ± 35° from the positive 1 axis and still produce such minor color distortions that observers skilled in color television design will have difficulty in detecting the color distortion. The reason for this is that yellow and magenta colors are not distorted. A range of ± 35° is adequate to correct flesh tone hue variations for the vast majority of the phase mis-alignments that occur in actual practice. However, if an additional range is desired to account for even the unusual mis-phasing, the color errors will become obvious for scenes with yellow unless additional complexity is added as is illustrated in the circuit of FIG. 3.

The circuit of FIG. 3 includes the same basic components which are shown in FIG. 2 and which have been described. These components have the same reference numbers and will not be discussed again since the operation remains the same. In addition, however, the circuit of FIG. 3 includes an envelope detector 25 connected to receive the chrominance input signals on terminal 10.

The output of the envelope detector 25 is passed through a low pass filter 26 to produce a relatively low frequency voltage which varies in amplitude in accordance with variations in the amplitude (saturation) of the chrominance signal. An amplitude comparator 27 resonds to these signals and compares them with a reference potential applied on a reference input 28, which may be derived from a suitable adjustable source (not shown).

Since it has been established that flesh colors normally do not exceed 70% saturation or peak chrominance amplitude, the reference signal applied to the terminal 28 is selected to correspond to 70° peak chrominance amplitude of the chrominance input signal. So long as the chrominance input signal has amplitude less than 70% which is similar to the 70% saturation line shown in FIG. 1, no output is obtained from the amplitude comparator circuit 24 and the circuit shown in FIG. 3 operates in the same way as the circuit of FIG. 2.

Whenever the chrominance input signals applied to the terminal 10, however, are of an amplitude which exceeds the reference amplitude on the terminal 28, an output signal is produced by the comparator circuit 27. This is applied to the single-pole, double-throw switch circuit 15 to cause the circuit 15 to switch to the condition passing the subcarrier reference signals from the limiter 16 through to its output, irrespective of the condition of the output of the phase comparator 13. The result is that the high chrominance areas of a scene (those having a chrominance amplitude greater than 70% of peak) are not corrected to the hue of the flesh axis at any phase. This permits extending the range of control or the angle $\alpha$ as far as $\pm$ 60°, and the system will still produce pleasing pictures on the cathode ray tube of the television receiver with this it is used. Thus, even though high chrominance yellow and magenta colors fall within the extended range of control when it is made this wide, the additional circuitry operating the amplitude comparator 27 permits high chrominance magenta and yellow colors to be unaffected by the hue correction system.

It is possible for a condition to exist where a color may have a hue near the end of the range $\pm$ $\alpha$ from the positive 1 axis. The chrominance information then possibly could be noisy enough so that the noise perturbations on the signal phase could carry it back and forth through the threshold of the amplitude comparator 19. This would cause the switching circuit 15 to switch back and forth between its two inputs which would result in shifts in hue from the positive 1 axis to somewhere outside the hue correction range. This would be noticeable by a viewer and possibly could be objectionable.

This affect can be eliminated or compensated for in several different ways. One is to provide some threshold hysteresis in the operation of the amplitude comparator 19. Another is to use a zero hysteresis amplitude comparator circuit 19, but sense the presence of an alternating current (AC) output from the comparator 19 and convert it to the appropriate control signal to defeat the switching back and forth of the switch circuit 15. This latter method would eliminate hue oscillation on the large area chrominance portions of a scene that are near the hue range threshold even under noisy conditions. The third approach is to make a gradual threshold for the switching of the amplitude comparator 19. In this approach, at the edge of the control range, the regenerated color subcarrier signal at the output of the limiter 16 can be added to the limited chrominance signal at the output of the limiter 12 by the switching circuit 15 or some other circuit to produce a signal which has a phase between the phases of the two limited signals.

The circuit of FIG. 4 utilizes this later approach to produce a "soft" threshold for the switching between the limited chrominance signal and the regenerated subcarrier signal supplied to the demodulator sections of the television receiver.

The circuit of FIG. 4 is suitable for fabrication in monolithic integrated circuit form, either as a separate integrated circuit or in combination with other circuit functions on a single integrated circuit chip. For the purpose of simplifying the schematic diagram of FIG. 4, the voltage reference section of the circuit has not been shown, but the different values of supply and bias voltages are indicated in FIG. 4. These can be obtained from any suitable bias supply section of an integrated circuit connected across a primary source of potential or voltage supply terminals for the integrated circuit chip.

The chrominance input signal and the subcarrier reference input signal at the positive I phase which were described in conjunction with FIGS. 2 and 3 are shown as applied to the respective terminals 10 and 11 in FIG. 4. These terminals are connected to the inputs of differential amplifier limiter circuits 12 and 16. The limiter circuit 12 includes two NPN transistors 30 and 31 connected in a differential amplifier configuration and supplied by an NPN current source transistor 32. Similarly, the limiter circuit 16 includes a pair of differentially connected NPN transistors 34 and 35 supplied with current from an NPN current source transistor 36. The transistors 32 and 36 are designed to draw approximately one milliamp of current.

Under quiescent conditions with no input signals applied to the terminals 10 and 11, the bias provided to the differential limiters 12 and 16 is such that the current from the current source 32 divides evenly between the transistors 30 and 31, and the current from the current source 36 divides evenly between the transistors 34 and 35. The input signals applied to the terminals 10 and 11 both are selected to have a peak-to-peak amplitude sufficient to provide good limiting of the circuits 12 and 16. Thus, the transistors 30 and 31 of the limiter circuit 12 are alternately driven to steer the current from transistor 32 through their respective collector resistors under the control of the chroma input signals on the terminal 10. Similarly, the transistors 34 and 35 are alternately driven to steer the current from transistor 36 through their respective collector resistors by the subcarrier reference signal applied to the terminal 11.

The limiter circuits 12 and 16 each feed the two input ports of doubly-balanced, differential, phase-comparator switching circuit 13. The circuit 13 includes two differentially connected pairs of transistors 40, 41 and 42, 43. The emitters of the transistor 40 and 41 are connected to the collector of an input transistor 45, the conduction of which is controlled by the transistor 30. Similarly, the emitters of the transistors 42 and 43 are connected to the collector of an input transistor 47, the conduction of which is controlled by the transistor 31 of the limiter circuit 12. The emitters of the transistors 45 and 47 are connected in common to an NPN current source transistor 49.

The outputs from the limiter circuit 16 are applied through a pair of NPN output transistors 51 and 52, respectively. The emitter of the transistor 51 is coupled to the common-connected bases of the transistors 41 and 42, and the emitter of the transistor 52 is connected to the common-connected bases of the transistors 40 and 43. Conduction of the transistors 51 and 52 in turn is controlled by the transistors 34 and 35, respectively.

The transistors 45, 47, 51 and 52 all are rendered more conductive whenever the corresponding transistors 30, 31, 34 and 35 connected to their bases are rendered less conductive and vice-versa. The result is that the phase detector circuit 13 operates in a conventional manner to produce an output signal across a load resistor 55 connected to the cross-connected collectors of the transistors 41 and 43. This signal is indicative of the phase relationship of the input signals applied to the terminals 10 and 11. The signal is at a minimum whenever the signals on the terminals 10 and 11 are in phase with one another and is at a maximum whenever the signals on the terminals 10 and 11 are 180° out of phase with one another. This is the reverse of the polarity described previously. It was arranged this way to economically accommodate a subcarrier reference on terminal 11 of negative I phase. However, the polarity described previously could be obtained by a simple change in the interconnection of the circuit in FIG. 4.

The output terminal at the junction of the collectors of the transistors 41 and 43 is coupled to a bonding pad 57 to which a filter capacitor 58, located externally of the integrated circuit chip, it connected. The capacitor 58 provides a low impedance path to ground for high frequency signal components appearing on the output of the phase comparator circuit 13. The lower frequency control signal, however, the amplitude of which is proportional to the phase difference between the chroma signal and the subcarrier reference signal applied to the terminals 10 and 11, is passed through an impedance converter and level shifting stage comprising of a pair of NPN transistors 59 and 60 interconnected in a quasi-Darlington amplifier configuration.

The amplitude of the DC level on the base of the transistor 59 also is adjusted by an external potentiometer 63 which is connected in circuit across a source of direct current potential. An NPN transistor 64 translates the potential on the potentiometer 63 and applies it to the bonding pad 57 at the base of the transistor 59.

The functions of the switching circuit 15 and amplitude comparator 19 of FIGS. 2 and 3 are combined in a dual differential amplifier steering circuit comprising a pair of differential amplifier switching comparators 64 and 65, including NPN transistors 66, 67 and 68, 69, respectively. The emitters of the transistors 66 and 67 are connected to an NPN current source transistor 71. Similarly, the emitters of the transistors 68 and 69 are connected to a NPN current source transistor 73. The collectors of the transistors 66 and 68 are connected directly to a source of 8.6 volts DC, and the collectors of the transistors 67 and 69 are connected through a common collector load resistor 75 to the same DC source.

The control signal on the emitter of the transistor 60, which is a composite of the setting of the potentiometer 63 and the output of the phase comparator 13, is applied to the common-connected bases of the transistors 66 and 69. The bases of the transistors 67 and 68 are connected to a suitable source of direct current bias potential which is provided by the bias circuit for the integrated circuit chip of which the circuit of FIG. 4 is a part. Whenever the control signal on the bases of the transistors 66 and 69 exceeds the reference level on the bases of the transistors 67 and 68, the transistors 66 and 69 are rendered more conductive that the transistors 67 and 68. Since the output resistor 75 is connected to the collectors of the transistors 67 and 69, the output from the comparator/switching circuits 64, 65 is obtained from the collector of the transistor 69 when the potential on the base of the transistor 69 is raised sufficiently above the potential on the base of the transistor 67. On the other hand, the output is obtained from the collector of the transistor 67 when the relative voltage levels on the bases of the transistors 67 and 69 are reversed.

Since the transistors 67 and 69 are supplied from different current sources 71 and 73, respectively, the effect is to sample one or the other of these current sources as the control voltage on the emitter of the transistor 60 becomes greater or less than the reference voltage on the bases of the transistors 67 and 68. There is a region, however, where the output appearing on the interconnected collectors of the transistors 67 and 69 is a composite of the signals present on the current source 71 and 73. This corresponds to the region of soft threshold which was mentioned above and which is indicated in FIG. 1 as the angle on each side of the angle 2 α a centered about the positive I axis.

The two current sources 71 and 73 each are modulated by control signals appearing on their bases. The signal which modulates the base of the transistor 71 is the limited subcarrier reference signal at the phase of the positive 1 axis relative to the received burst components of the composite chroma signal. This signal is obtained from the emitter of the transistor 51 and is applied through an isolating diode 77 to the base of an emitter-follower NPN transistor 78, which is turn is coupled to the base of the transistor 71. The transistor 51, along with the diode 77, rransistor 78, and a pair of diodes 79, connected to the emitter of the transistor 78, provide appropriate level shifting and buffering of the signal appearing on the collector of the transistor 34 in the limiter 16.

In a similar manner, the base of the current source trancistor 73 is modulated by the limited version of the chroma signal. This signal is obtained from the collector of the transistor 31 and is level-shifted and buffered by an NPN transistor 81 and a diode 82.

The result of the operation of the circuit is that the limited version of either of the chroma input signal or the reference subcarrier signal is fed through the circuits 64, 65 to the output resistor 75. The signal then is supplied through a quasi-Darlington NPN output stage 84 as the corrected reference output signal which is used by the television receiver as the switching or demodulating signal for the synchronous demodulators.

The circuitry comprising the two differential switching circuits 64 and 65, along with the current source transistors 71 and 73 and their input connections combines three operating functions; namely, the comparator circuit 19 of FIGS. 2 and 3; the single-pole, double-throw switch function of the switch circuit 15 of FIGS. 2 and 3; and a soft threshold switching region established during the time that both transistors 67 and 69 are conductive when the circuit passes through one switching state to the other. The circuit also is capable of providing gain if the resistor 75 is made larger than the emitter resistors of the current source transistors 71 and 73.

The soft threshold region is provided by emitter degeneration of the doubly balanced switch circuits 64, 65. The internal emitter impedance, which is related to the current flow through these circuits, has been found to be sufficient to provide the desired soft threshold. The threshold can be minimized to a small percentage of the total control range by minimizing the internal emitter impedances of the circuits. Additional emitter impedances could be added for providing additional emitter degeneration, if desired, but this does not appear to be necessary.

To set up the operating conditions for the system in a television receiver initially it is necessary to adjust the phase of the reference signal input on the terminal 11 to be sure that it is on the negative I axis for the interconnections shown in FIG. 4. A second adjustment is for the range of control which is effected by adjusting the reference level for the amplitude comparator. In FIG. 4 this amounts to an adjustment of the setting of the potentiometer 63. The setting of the potentiometer 63 is combined with the output of the phase comparator 13 on the bonding pad 57 to minimize the number of bonding pads required for the circuit. If this is no problem the reference level from the potentiometer 63 could be applied through another bending pad to the junction of the bases of the transistors 67 and 68.

By substituting the limited chrominance subcarrier signals for the reference subcarrier whenever the signal is within the range of control, all signals within the range of control are effectively transposed to the positive I axis for demodulation therefore overcoming all variations in hue which lie within this range of control. This result is obtained since the chrominance signal in effect is used to demodulate itself. At the same time, the system operates in the normal manner for all signals lying outside of the range of control when the subcarrier reference signal is used to effect the demodulation.

The result is that colors lying outside the wedge of control at the positive 1 axis are unaffected by the system which flesh tones are effectively corrected to compensate for variations in hue in these tones. Utilization of the circuit shown in FIG. 3 extends the capabilities of the system to ignore high chrominance signals which lie outside the range encountered in flesh tone variations. As stated earlier, although the operation has been analyzed for an I/Q type of detection for clarity and ease of presentation, any decoding angles can be accommodated by the appropriate phase shifting of the output of the switch circuit 15 of FIGS. 2 and 3 or the corrected reference output of the Darlington amplifier circuit 84 in FIG. 4.

The circuit operates to correct the flesh tone problem without introducing any additional distortions to colors about the Q axis. In addition, the chrominance amplitude is unaffected by this system even within the control range. Thus, greens are not distorted in either hue or saturation. There is some distortion of the hue of some yellowish-orange and red colors within the preferred control range of approximately 60°. This affect is contrasted with an offensive distortion of greens and occasionally annoying distortion of reds and yellows by conventional approaches of changing the decoding angles to emphasize 1 axis colors.

I claim:

1. An automatic hue control circuit for a color television receiver responsive to a received composite signal including at least a modulated subcarrier signal, modulated in phase and amplitude to represent hue and saturation of a color image, and a burst component, said hue control circuit including in combination:
first means for providing signals at the frequency and phase of the received modulated subcarrier signal;
second means for providing signals at the frequency of said subcarrier signal and at a predetermined phase relative to the burst component;
comparison circuit means including a phase comparator circuit means having first and second inputs and an output and an amplitude comparator circuit means having first and second inputs and an output, the first and second inputs of said phase comparator circuit means being coupled with said first and second means for providing signals, and the output of said phase comparator circuit means being coupled with one of the inputs of said amplitude comparator means, and means for supplying a reference voltage to the other input of said amplitude comparator circuit means, said output of said amplitude comparator circuit means comprising the output of said comparison circuit means; and
reference signal supply means coupled with the output of said comparison circuit means for supplying reference signals at the frequency of said subcarrier signal and at said predetermined phase relative to said burst component in response to the outputs from said comparison circuit means corresponding to a first predetermined phase relationship of the signals provided by said first and second signal providing means, and supplying reference signals at the frequency and phase of the received modulated subcarrier signal in response to the outputs from said comparison circuit means corresponding to a second predetermined phase relationship of the signals provided by said first and second signal providing means.

2. The combination according to claim 1 wherein said reference signal supply means includes switching circuit means having an output and first and second inputs for coupling said first input to the output thereof in response to outputs from said comparison circuit means corresponding to said first phase relationship and for coupling said second input to the output thereof in response to outputs from said comparison circuit means corresponding to said second phase relationship, said first input coupled with said first signal providing means and said second input coupled with said second signal providing means.

3. The combination according to claim 2 wherein said first signal providing means includes first limiter circuit means coupled to receive the modulated subcarrier signal for producing a constant amplitude signal corresponding in frequency and phase to the received modulated subcarrier signal.

4. The combination according to claim 3 wherein said second signal providing means includes second limiter circuit means supplied with reference signals at said predetermined phase with respect to the burst component and producing output signals at the same amplitude as said first limiter circuit means.

5. An automatic hue control circuit for a color television receiver responsive to a composite signal including at least a subcarrier signal, modulated in phase and amplitude to represent hue and saturation of a color image, and a burst component, said circuit providing a subcarrier reference signal at the frequency of the received subcarrier signal and including in combination:

first means for supplying signals corresponding in frequency and phase to the received subcarrier signal;

second means for supplying reference signals at the frequency of the received subcarrier signal and at a predetermined phase relative to the phase of the burst component;

phase comparator circuit means having first and second inputs coupled with said first and second means for supplying signals. respectively, and having an output;

means for supplying a reference voltage;

amplitude comparator circuit means having first and second inputs, with said first input coupled with the output of said phase comparator circuit means and said second input coupled with said means for supplying said reference voltage, and having an output for supplying output signals thereon indicative of which of the two input signals applied thereto is of the greater amplitude; and switching circuit means having an output for providing the subcarrier reference signal for said hue control circuit, first and second signal inputs, and a control input, the control input coupled with the output of said amplitude comparator circuit means and the first and second inputs thereof coupled with said first and second means for supplying signals, respectively, said first input thereof being coupled with the output thereof in response to output signals from said amplitude comparator circuit means indicative of a first predetermined relationship of the amplitudes of the input signals applied to said amplitude comparator circuit means, and said switching circuit means coupling said second input thereof with the output thereof in response to output signals from said amplitude comparator circuit means indicative of a second predetermined relationship of the amplitudes of the signals applied to said amplitude comparator circuit means.

6. The combination according to claim 5 wherein said first and second means for supplying input signals include first and second limiter circuit means, respectively, with the outputs of said first and second circuit means being of substantially equal amplitude.

7. The combination of claim 5 further including:
envelope detector means adapted to receive the subcarrier signal;
low pass filter means for filtering said subcarrier signal being coupled to said envelope detector means and providing a filtered subcarrier signal;
amplitude comparator means coupled to said low pass filter means and adapted to receive an additional reference signal, said amplitude comparator means comparing the amplitude of said additional reference signal to the amplitude of said filtered subcarrier signal provided by said low pass filter means and selectively providing a control signal; and
circuit means coupling said amplitude comparator means to said switching circuit means, said switching circuit means being responsive to said control signal to connect the signal from said second means to the output thereof regardless of the phasing of said subcarrier and subcarrier reference signals.

8. The combination according to claim 5 wherein said amplitude comparator circuit means and said switching circuit means comprise a single steering circuit means having first and second signal inputs corresponding to said first and second signal inputs of said switching circuit means and having first and second control inputs corresponding to said first and second inputs of said amplitude comparator circuit means respectively.

9. The combination according to claim 8 further including means for supplying a bias potential to one of the control inputs of said steering circuit means.

10. The combination according to claim 8 wherein said steering circuit means comprises first and second differential switching circuits, each having a pair of control inputs, with said reference voltage applied to one control input and the output of said phase comparator coupled with the other control input, and each having a signal input, with the signal input of said first differential switching circuit coupled with said first means for supplying signals and the signal input of said second differential switching circuit coupled with said second means for supplying signals, a common output terminal coupled with said first and second differential switching circuits, said second differential switching circuit coupling said common output terminal with the signal input thereof whenever the signals supplied by said first and second means for supplying signals are out-of-phase greater than a predetermined amount as determined by the amplitude of said reference voltage, and said first differential switching circuit coupling said common output terminal with the signal input thereof whenever the signals supplied by said first and second means for supplying signals are in phase or out-of-phase by an amount less than said predetermined amount.

11. The combination according to claim 10 further including first and second voltage supply terminals and wherein said first differential switching circuit comprises first and second switching transistors and a first input transistor of a predetermined conductivity type, each having collector, base, and emitter electrodes, said second differential switching circuit comprises third and fourth switching transistors and a second input transistor of said predetermined conductivity type, each having collector, base, and emitter electrodes; the collector of said first input transistor coupled in common to the emitter electrodes of said first and second switching transistors, the emitter of said first input transistor coupled with said second voltage supply terminal, and the base of said first input transistor coupled with said first means for supplying signals; the collector of said second input transistor coupled in common with the emitter electrodes of said third and fourth switching transistors, the emitter of said second input transistor coupled with said second voltage supply terminal and the base of said second input transistor coupled with said second means for supplying signals; the collectors of said first and third switching transistors coupled with said first voltage supply terminal; resistive impedance means coupled between said first voltage supply terminal and the collectors of said second and fourth switching transistors; means for coupling said means for supplying a reference voltage with the bases of said first and fourth switching transistors; means for supplying a bias potential and the output of said phase comparator circuit to the bases of said second and third switching transistors; and second common output terminal coupled with the collectors of said second and fourth transistors.

12. A hue control circuit for providing a chrominance demodulating signal responsive to a chrominance information signal modulated in phase and amplitude to represent hue and saturation of a color image and to a subcarrier reference signal, the hue control circuit including in combination:

limiter means adapted to receive the chrominance information signal, said limiter means being responsive to the chrominance information signal to supply a first signal having a constant amplitude and corresponding in frequency and phase to the chrominance information signal;

circuit means for supplying a second signal at a frequency controlled by the subcarrier reference signal;

phase comparator circuit having inputs coupled with said limiter means and said circuit means, said phase comparator circuit means comparing said first and second signals and providing an output signal at an output terminal thereof; and switch means having a control terminal being coupled to said output terminal of said phase comparator, and input terminals coupled to said circuit means and to said limiter means, said switch means selectively combining said first signal and said second signal in response to the output signal of said phase detector to form the chrominance demodulating signal.

13. The combination of claim 12 wherein said switch means includes:

signal combining means coupled to receive said first and second signals; and variable conductance means with a soft threshold and having an output terminal coupled to said signal combining means, at least one input terminal coupled to at least one of said limiter and circuit means, and a control terminal coupled to said phase comparator circuit, said variable conductance means controlling the magnitude of at least one of said first signal and said second signal being applied to said signal combining means, said signal combining means adding the first and second signals applied thereto to form the chrominance demodulating signal having a phase dependent upon said first signal and said second signal.

14. The combination of claim 12 wherein said phase comparator circuit has first and second input terminals and an output terminal, said first and second input terminals of said phase comparator circuit being respectively coupled with said limiter means and said circuit means, and the output terminal of said phase comparator circuit being coupled to said switch means.

15. A method of providing hue control in a color television, including the steps of:

providing first signals at the frequency and phase of the chrominance signal;

providing second signals at a frequency and phase controlled by the reference subcarrier for the chrominance signal;

phase detecting said first and second signals to provide a control signal having an amplitude responsive to the phase differential between said first and second signals; and combining said first and second signals to form a chrominance demodulating reference signal, the magnitude of said control signal being capable of controlling the magnitude of at least one of said first and second signals being combined so that said magnitude can have any value within a continuous operating range.

16. The method of claim 15 wherein said combining step includes adding said first and second signals to provide the said chrominance demodulating reference signal.

17. The method of claim 15 further including the step of limiting said chrominance signal before the step of phase detecting said first and second signals.

18. A hue control circuit for providing a chrominance demodulating signal responsive to a chrominance information signal modulated in phase and amplitude to represent hue and saturation of a color image and to a subcarrier reference signal, the hue control circuit including in combination:

limiter means adapted to receive the chrominance information signal, said limiter means being responsive to the chrominance information signal to supply a first signal having a constant amplitude and corresponding in frequency and phase to the chrominance information signal;

first circuit means for supplying a second signal at a frequency controlled by the subcarrier reference signal;

a phase comparator circuit having inputs coupled with said limiter means and said first circuit means, said phase comparator circuit comparing said first and second signals and providing an output signal at an output terminal thereof; and second circuit means having a control terminal coupled to said output terminal of said phase comparator circuit for receiving a control signal which has a magnitude that is a function of the magnitude of said output signal of said phase comparator circuit, and input terminals coupled to said first circuit means and to said limiter means, said second circuit means having a variable conductance for selectively combining said first signal and said second signal in response to the magnitude of said control signal to form the chrominance demodulating signal, said variable conductance of said second circuit means being capable of continuously adjusting the magnitude of at least one of said first signal and said second signal to any value between upper and lower limits in response to said magnitude of said control signal so that said one of said first signal and said second signal has a continuous range of operating magnitudes.

19. The hue control circuit of claim 18 wherein said second circuit means includes:

amplitude sensitive gating means; and signal combining means having at least one terminal coupled to receive said first signal and said second signal.

20. The hue control circuit of claim 18 wherein said second circuit means adjusts the magnitude of said first signal.

21. The hue control circuit of claim 18 wherein said second circuit means adjusts the magnitude of said second signal.

22. The hue control circuit of claim 18 wherein said limiter means, said first circuit means, said phase comparator circuit and said second circuit means are all formed as part of a monolithic integrated circuit for use in a color television receiver.

23. The hue control circuit of claim 18 wherein said first circuit means includes a further limiter circuit which is supplied with reference signals at a predetermined phase with respect to said subcarrier reference signal and which produces said second signals of the same amplitude as the output signals of said limiter means.

24. The hue control circuit of claim 18 wherein said second circuit means comprises first and second differential switching circuits, each having a pair of control inputs, means for applying a reference voltage to one control input of each differential switching circuit and the output of said phase comparator circuit being coupled with the other control input, and each having a signal input, with the signal input of said first differential switching circuit being coupled with said limiter means and the signal input of said second differential switching circuit coupled with said first circuit means, a common output terminal coupled with said first and second differential switching circuits, sid second differential switching circuit coupling said common output terminal with the signal input thereof whenever the signals supplied by said limiter means and said first circuit signals are out-of-phase greater than a predetermined amount as determined by the amplitude of said reference voltage, and said first differential switching circuit coupling said common output terminal with the signal input thereof whenever the signals supplied by said limiter means and said first circuit means are in phse or out-of-phase by an amount less than said predetermined amount.

25. The hue control circuit of claim 18 further including:
- envelope detector means adapted to provide a detected chrominance information signal;
- amplitude comparator means coupled to said envelope detector means and adapted to receive a reference signal, said amplitude comparator means comparing the amplitude of said reference signal to the amplitude of said detected chrominance information signal and selectively providing a further control signal; and
- additional circuit means coupling said amplitude comparator means to said second circuit means, said second circuit means being responsive to said further control signal to connect said second signal from said first circuit means to the output thereof regardless of the phasing of said chrominance information signal and said subcarrier reference signal.

26. The hue control circuit of claim 18 wherein said second circuit means adjusts the magnitude of said one of said first and second signals as a function of said magnitude of said control signal.

* * * * *